United States Patent [19]

Satoh et al.

[11] Patent Number: 5,247,868
[45] Date of Patent: Sep. 28, 1993

[54] BRAKE BOOSTER OF TANDEM TYPE

[75] Inventors: Tohru Satoh; Shintaro Uyama, both of Saitama, Japan

[73] Assignee: Jidosha Kiki Co., Ltd., Tokyo, Japan

[21] Appl. No.: 831,852

[22] Filed: Feb. 5, 1992

[30] Foreign Application Priority Data

| Feb. 21, 1991 | [JP] | Japan | 3-14681[U] |
| Feb. 21, 1991 | [JP] | Japan | 3-14682[U] |
| Feb. 21, 1991 | [JP] | Japan | 3-14683[U] |
| Feb. 22, 1991 | [JP] | Japan | 3-15152[U] |

[51] Int. Cl.$^5$ ................................. F15B 9/10
[52] U.S. Cl. ........................ 71/376 R; 92/48
[58] Field of Search ............. 91/369.1, 369.2, 369.3, 91/369.4, 376 R; 92/48, 49

[56] References Cited

U.S. PATENT DOCUMENTS

| 4,069,742 | 1/1978 | Gephart et al. | 91/376 E |
| 4,512,237 | 4/1985 | Endoh et al. | |
| 4,587,884 | 5/1986 | Tsubouchi | 91/376 R |
| 4,658,704 | 4/1987 | Mori et al. | |
| 4,718,326 | 1/1988 | Sugiura et al. | 91/376 R |

*Primary Examiner*—Edward K. Look
*Assistant Examiner*—F. Daniel Lopez
*Attorney, Agent, or Firm*—Flynn, Thiel, Boutell & Tanis

[57] ABSTRACT

An enclosed shell is divided by a center plate and a pair of front and rear diaphragms which are disposed on the opposite sides of the center plate into four chambers. A center body is fitted over a valve body which internally houses a valve mechanism. The center body slides relative to the central portion of the center plate with a seal member interposed therebetween. The inner periphery of the front diaphragm is inserted inside the center body, and is held between the valve body and the center body at a location rearward of the seal member, whereby the overall length of the brake booster is reduced.

10 Claims, 4 Drawing Sheets

BRAKE BOOSTER OF TANDEM TYPE

BACKGROUND OF THE INVENTION

The invention relates to a brake booster of tandem type having a pair of front and rear power pistons disposed seriatim within an enclosed shell.

A conventional brake booster of tandem type includes an enclosed shell formed by a front and a rear shell, and the interior of the shell is divided by a center plate into a pair of chambers. A chamber which is located forwardly of the center plate is in turn divided by a combination of a front power piston and a front diaphragm into another pair of chambers, and a chamber disposed rearwardly of the center plate is also divided by a combination of a rear power piston and a rear diaphragm into a pair of chambers.

A valve body internally housing a valve mechanism which opens and closes fluid passages slidably fits in a central portion of the center plate with a seal member interposed therebetween, and the inner periphery of the front and rear power pistons and diaphragms are secured respectively to the outer periphery of the valve body on the opposite sides of the center plate.

A pair of passages are formed within the valve body, one passage provides a communication between the constant pressure chambers which are located forwardly of the front and rear diaphragms in communication with a source of negative pressure, and another passage providing a communication between variable pressure chambers both disposed rearwardly of the respective diaphragms.

In a conventional arrangement as described above, the area through which the valve body slides with respect to the center plate and the area where the front diaphragm and the front power piston are clamped to the valve body are disposed seriatim axially, so that it results the booster to be suffered from an increased overall length. In addition, the passage which provides a communication between the both variable pressure chambers is located in a region of the valve body where the strength is of a greater significance, and this prevented an increased channel area from being obtained.

In a conventional brake booster of tandem type, when assembling the valve body and the center body together, it is essential to assure a positive communication between portions of passages which provide a communication between pressure chambers. The respective passage portions must be positioned to provide a communication therebetween while rotating the both bodies, which prevented an efficient assembly from being achieved.

SUMMARY OF THE INVENTION

Accordingly, it is an object of the invention to reduce the overall length of a brake booster of tandem type and to improve its response by providing an increased area for the atmospheric channel.

The above object is accomplished by replacing a conventional valve body by a combination of a section which internally houses a valve mechanism and a tubular center body which is connected thereto. The front diaphragm is inserted into the center body from its front side and its inner periphery is held sandwiched between the valve body and the center body at a location rearward of the seal member while providing a passage communicating between the variable pressure chambers by the space defined between the inner surface of the center body and the outer surface of the front diaphragm.

It is another object of the invention to provide a brake booster of tandem type in which the likelihood of blocking a passage providing a communication between the both variable pressure chambers is eliminated.

It is a further object of the invention to provide a brake booster of tandem type in which a communication through the respective passage is assured by merely disposing the valve body and the center body in superimposed relationship, thus improving the assembly.

DESCRIPTION OF EMBODIMENTS

Figure 1:
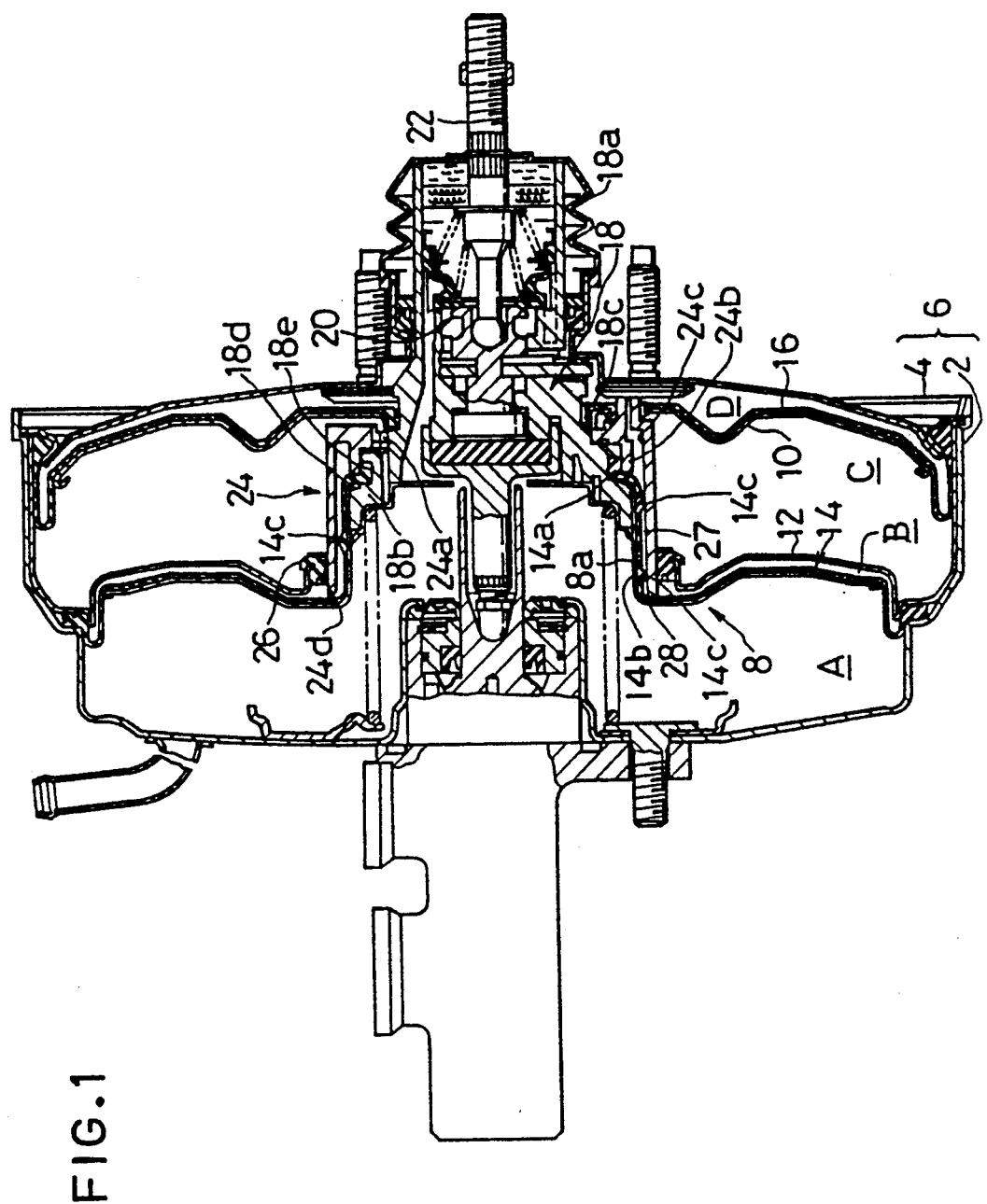
FIG. 1 is a longitudinal section of a brake booster of tandem type according to one embodiment of the invention.

Referring to the drawings, several embodiments of the invention will now be described. A brake booster shown includes a front shell 2 and a rear shell 4 which are coupled together to defined an enclosed shell 6, in which a front power piston 8 and a rear power piston 10 are disposed seriatim. The interior of the shell 6 is divided by a center plate 12 into a front chamber in which the front power piston 8 is disposed and a rear chamber in which the rear power piston 10 is disposed. The front chamber is in turn divided by a front diaphragm 14 applied to the back surface of the front power piston 8 into pressure chambers A and B while the rear chamber is also divided by a rear diaphragm 16 applied to the back surface of the rear power piston 10 into pressure chambers C and D.

A valve body 18 is disposed in an axial portion of the enclosed shell 6 and includes a tubular section 18a of a reduced diameter which projects rearwardly of the rear shell 4. A valve mechanism 20 which is well known in itself is internally housed within the valve body 18, and is responsive to an operation of an input shaft 22 to provide a communication or to interrupt a communication between the pressure chambers A and C (constant pressure chambers) located forwardly, and the pressure chambers (variable pressure chambers) B and D, located rearwardly of the diaphragms 14, 16, and between the variable pressure chambers B and D and the atmosphere.

The valve body 18 includes a portion 18b of an increased diameter which is disposed within the enclosed shell 6, and a center body 24 is fitted around the portion 18b. An annular groove 18c is formed in the outer periphery of the valve body 18 at a central location thereof, and the inner periphery of the rear power piston 10 and the rear diaphragm 16 is fitted in the annular groove 18c. At its rear end, the center body 24 is formed with an in-turned flange 24a, which is fixedly held between the rear power piston 10 and a step in the valve body 18. The outer peripheral surface of the center body 24 is slidable with respect to the central or radially inner portion of the center plate 12 with a seal member 26 interposed therebetween.

The inner periphery of the front power piston 8 is formed into a cylindrical portion 8a which extends rearwardly and which is fitted inside the inner surface of the center body 24 with a spacing therefrom. The rear end of the cylindrical portion 8a of the front power piston 8 is turned inwardly to be engaged with a step 18d formed around the outer periphery of the valve body 18. An annular groove 18e is formed in the outer periphery of the valve body 18 at a location adjacent to the step 18d, and the inner peripheral edge 14a of the front diaphragm 14 is fitted in the annular groove 18e. On its outer side, the inner surface of a portion 24b of the center body 24 which has an increased thickness overlaps, thereby securing the front diaphragm 14 and the front power piston 8 in place. The inner peripheral edge 14a of the front diaphragm 14 is located inward of the region where the center body 24 slides with respect to the seal member 26, or the outer peripheral surface of the center body 24.

The portion 24b of the center body 24 which has an increased thickness is formed with an opening 24c which axially extends therethrough. The front diaphragm 14, which is supported on the outer surface of the cylindrical portion 8a of the front power piston 8, includes a cylindrical portion 14b, the outer surface of which is formed with a plurality of projections 14c. A slit 24d is formed in the front end face of the center body 24. An atmospheric passage which provides a communication between the both variable pressure chambers B and D is provided by the through-opening 24c in the center body 24, a space 27 defined between the cylindrical portion 14b of the front diaphragm 14 and the inner surface of the center body 24, and a clearance 28 between the front end face of the center body 24 and the opposite front diaphragm 14.

In the brake booster constructed in the manner mentioned above, the front diaphragm 14 and the front power piston 8 are inserted into the valve body 18, and are secured between the valve body 18 and the valve body 18 at a location rearward of the sliding region between the center plate 12 and the center body 24 (or the region of the seal member 26), thereby reducing the axial length. During the operation of the booster, the inner peripheral edge 14a of the front diaphragm 14 may move forward of the seal member 24. The atmospheric passage is provided by the space 27 between the center body 24 and the front diaphragm 14, and the center body 24 is secured in place by the valve body 18 and the rear power piston 10. Consequently, an increased channel area is enabled while avoiding any loading upon the parts which constitute the atmospheric passage.

In addition, the slit 24d formed in the front end face of the center body 24 avoids the likelihood of interrupting a communication between the variable pressure chambers B and D in the event the front diaphragm 14 moves away from the power piston 8 and happens to contact the center body 24 when the input shaft is driven forward without initially removing the vacuum condition as when deairing the master cylinder, thus eliminating any likelihood of presenting an increased resistance and also preventing an adverse influence upon the operating response during its normal operation.

In addition, the provision of the projection 14c in a portion of the front diaphragm 14 which is disposed inside the center body 24 assures that the passage between the variable pressure chambers B and D can be maintained in the event the front diaphragm 14 expands, thus preventing any adverse influence upon the operating response. This also prevents any increase in the resistance presented upon depression without initially removing the vacuum condition. Furthermore, the projection 14c serves as a guide when assembling the center body 24, thus contributing to the improvement of the assembling operation.

In the described embodiment, the slit 24d is formed in the front end face of the center body 24, but it should be understood that as an alternative, a recess or projection or a rib may be formed in or on the front diaphragm 14 which is disposed in opposing relationship with the front end face. The plurality of projections 14c formed on the outer surface of the front diaphragm 14 may be replaced by axially extending ribs to secure the atmospheric passage.

Figure 2:
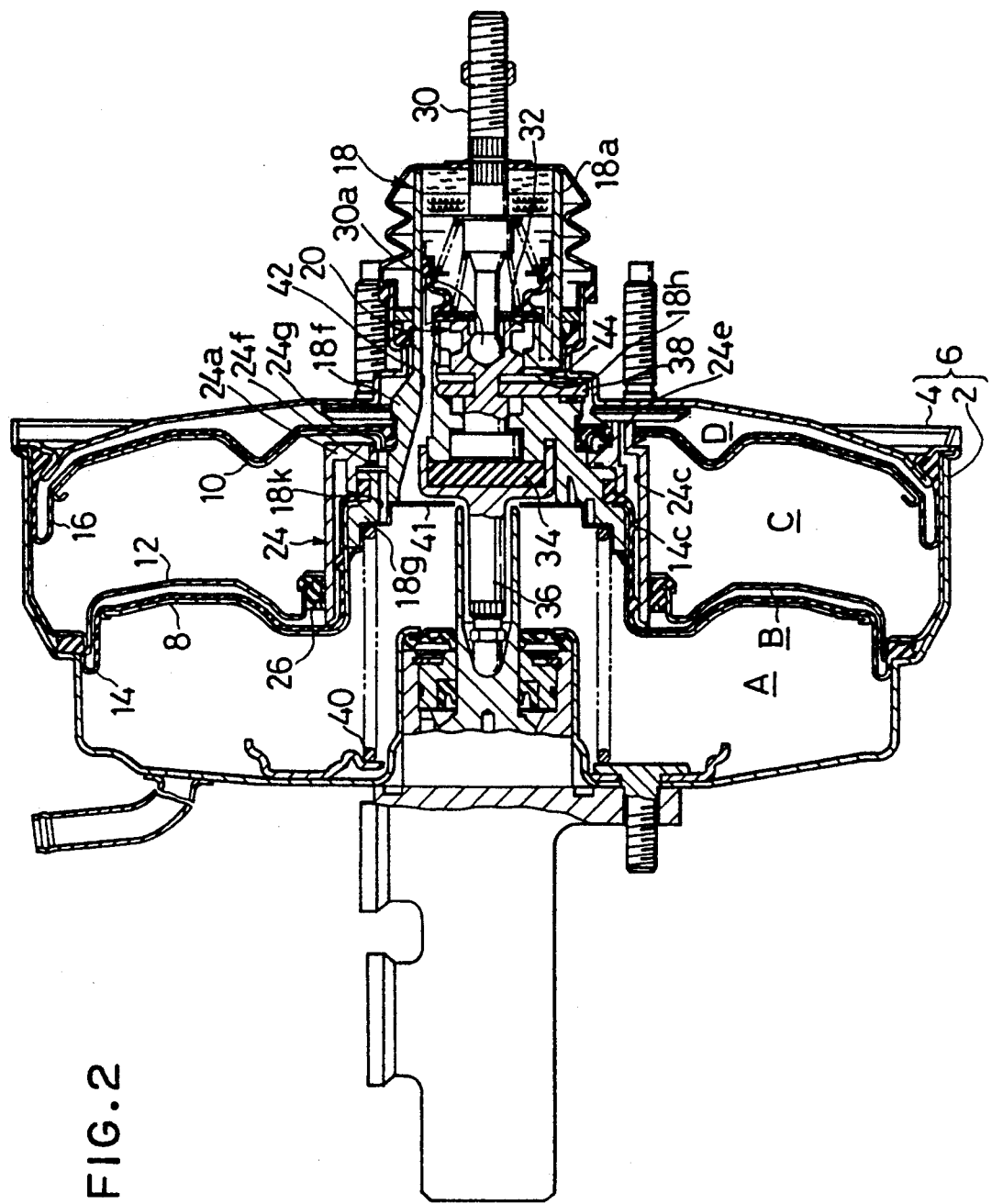
FIG. 2 is a longitudinal section of a brake booster of tandem type according to a second embodiment of the invention.
Figure 3:
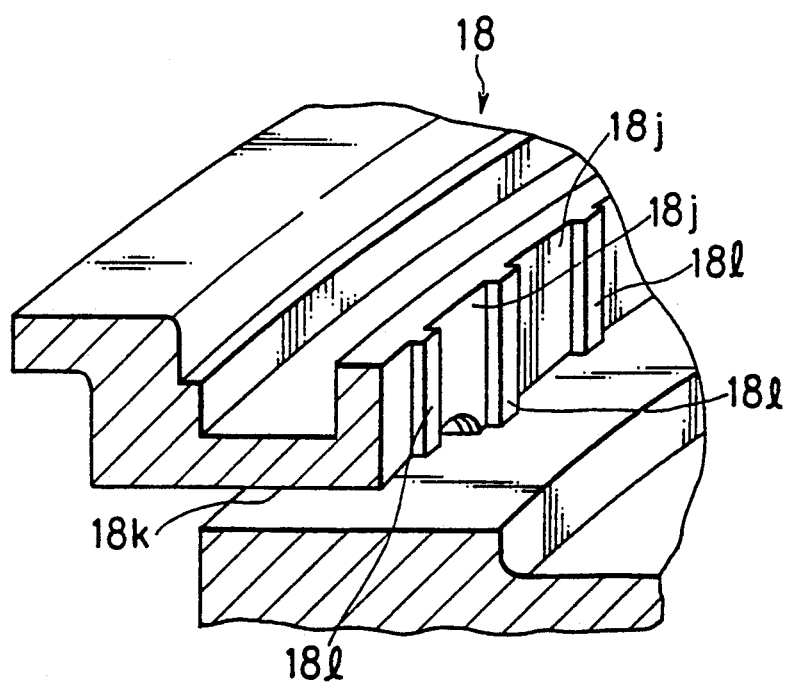
FIG. 3 is a perspective view, to an enlarged scale, of part of the valve body of the brake booster shown in FIG. 2.
Figure 4:
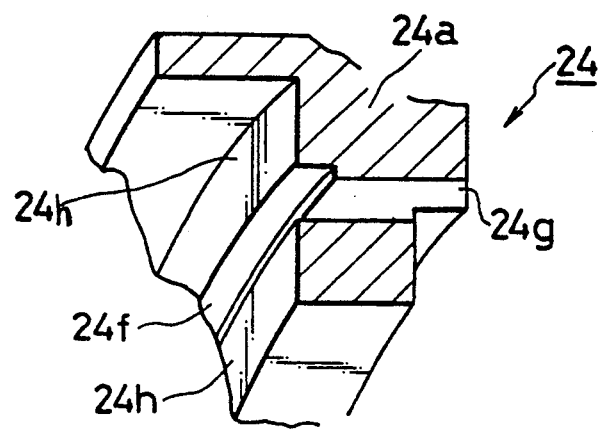
FIG. 4 is a perspective view, to an enlarged scale, of part of the center body of the brake booster shown in FIG. 2.

FIGS. 2 to 4 illustrate a second embodiment of the invention. As before, a front shell 2 and a rear shell 4 are coupled together to defined an enclosed shell 6, in which a front power piston 8 and a rear power piston 10 are disposed seriatim. The interior of the shell 6 is divided by a center plate 12 into a front chamber in which the front power piston 8 is disposed and a rear chamber in which the rear power piston 10 is disposed. A front diaphragm 14 applied to the back surface of the front power piston 8 divides the front chamber into pressure chambers A and B while a rear diaphragm 16 applied to the back surface of the rear power piston 10 divides the rear chamber into pressure chambers C and D.

A funnel-shaped valve body 18 is disposed in the axial portion of the enclosed shell 6, and includes a tubular section 18a internally housing a valve mechanism 20, to be described later, and sections 18f and 18g of an intermediate and a greater diameter, both tubular in configuration, which are integrally connected to the tubular section 18a and having gradually increasing diameters. At its rear end, a center body 24 fits over the section 18g of a greater diameter, and at a location rearward of such fitting engagement, the valve body 18 is formed with an annular groove in which the inner periphery of the rear power piston 10 and the rear diaphragm 16 is fitted. The front power piston 8 and a front diaphragm 14 which is applied to the back surface thereof have their inner periphery extending along the inner peripheral surface of the center body 24 and held between the section 18g of a greater diameter of the valve body 18 and the center body 24. The front diaphragm 14 which is held between the section 18g of a greater diameter of the valve body 18 and the center body 24 has a plurality of projections 14c formed on its outer peripheral surface, which engage the inner peripheral surface of the center body 24 to define a clearance therebetween (between the front diaphram 14 and the center body 24), which is effective to form a passage providing a communication between pressure chambers B and D, which will be described later. It is to be noted that the inner periphery of the center plate 12 is axially slidable relative to the center body 24 with a seal member 26 interposed therebetween.

The valve body 18 is centrally formed with a bore, in which a valve plunger 32 is slidably fitted, the plunger being caulked to a spherical tip end 30a of an operating rod 30 which is mechanically coupled to a brake pedal, not shown. On the other hand, a reaction disc 34 carrying a driven rod 36 is disposed in the front end of the central bore within the valve body 18. Accordingly, when the brake booster is operated, a braking reaction is transmitted to the brake pedal through the driven rod 36, the reaction disc 34, the valve plunger 32 and the operating rod 30. A key 38 is inserted into a radially extending slot 18h which is formed in the rear end of the section 18f of an intermediate diameter of the valve body 18, and is effective to prevent the withdrawal of the valve plunger 32. A return spring 40 acts between the inner surface of the front shell 2 and a retainer 41 which is fitted in the rear end of the driven rod 36 for normally urging the front power piston 8 and the rear power piston 10 to inoperative positions shown.

At a location adjacent to the central bore therein, the valve body 18 is formed with an axially extending passage 42, through which a communication is established between the pressure chamber A and the interior of the tubular section 18a. A passage 44 which connects between the pressure chamber D and the tubular portion 18a is formed in and extends radially through the sidewall of the section 18f of an intermediate diameter of the valve body 18 at its rear end, the passage 44 enabling a communication between the pressure chambers A and D through the passage 42. A tubular projection 24e is formed in the rear end face of the center body 24, extending through the rear power piston 10 and the rear diaphragm 16 adjacent to their inner periphery. The projection 24e is formed with an axial through-opening, which is effective to define a passage 24c continuing to the clearance defined between the front diaphragm 14 and the inner surface of the center body 24 and which provides a communication between the pressure chambers B and D.

The rear end face of the section 18g of a greater diameter of the valve body 18 as well as the inner surface of an inwardly extending flange 24a formed on the rear end of the center body 24 which abuts against the rear end face of the section 18g are formed as follows: specifically, as illustrated in FIG. 3, the rear end face of the valve body 18 is formed with a plurality of radial slots 18j which are equi-distantly disposed in the circumferential direction, and its inner portion is formed with an axially extending through-opening 18k of an increased width. Projections 18l from the rear end face which are formed between adjacent grooves 18j is disposed for abutment against an overhang 24a of the center body 24, the inner surface of which is formed with an annular groove 24f, located intermediate its width, and a passage 24g axially extending through the overhang 24a Accordingly, when the center body 24 is assembled with the valve body 18, as the abutting surface 18l of the valve body 18 is disposed in abutment against the abutting surface 24h of the overhang 24a of the center body 24, the passage 18k in the valve body 18 and the passage 24g of the center body 24 are connected to each other through the groove 18j and the annular groove 24f, thereby establishing a communication between the pressure chambers A and C.

As a consequence, in the present embodiment, when the passage 18k of the valve body 18 and the passage 24g of the center body 24 are to communicate during the assembly of the booster, merely disposing the both passages 18k, 24g in superimposed relationship is sufficient to establish a communication therebetween through the groove 18j in the valve body 18 and the annular groove 24f in the center body 24 without recourse to rotating the both bodies 18, 24 to align the both passages 18k and 24g relative to each other as has been done in the prior art, thus facilitating the assembly.

Figure 5:
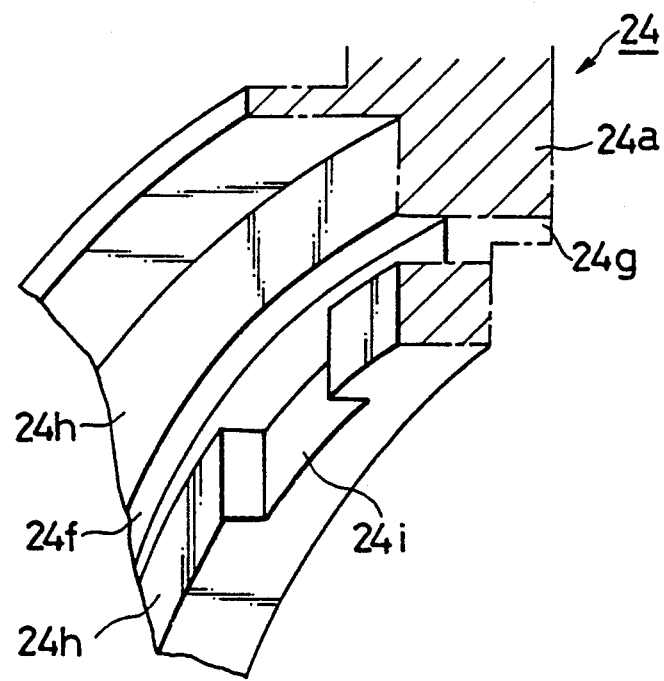
FIG. 5 is a perspective view showing a modification of the center body.

FIG. 5 shows a brake booster of tandem type according to a further embodiment of the invention where the rear end face of the section 18g of a greater diameter of the valve body 18 is defined by a flat surface in which no groove is provided while the overhang 24a of the center body 24 is formed with a plurality of grooves 24i, which are equi-distantly disposed in the circumferential direction, extending from the annular groove 24f and opening into its inner surface. In other respects, the arrangement is similar to that of the embodiments described above. This embodiment again achieves the similar function and effect as achieved by other embodiments.

It should be understood that the invention is not limited to any embodiment described above, but is equally applicable where the valve body and the center body are formed with an annular groove leading to a selected passage and a continuing radial groove at locations disposed opposite to each other.

What is claimed is:

1. A brake booster of tandem type including a center plate which divides the interior of an enclosed shell into a front and a rear chamber, a front diaphragm and a rear diaphragm disposed to be reciprocable in each of the front and the rear chamber and dividing each chamber into a forwardly located, constant pressure chamber and a rearwardly located, variable pressure chamber, a valve mechanism internally housed in a valve body for controlling a communication between the constant pressure chamber and the variable pressure chamber and between the variable pressure chamber and the atmosphere, and a center body connected to the valve body and slidable through the central portion of the center plate with a seal member interposed therebetween;

characterized in that the inner periphery of the front diaphragm is held between the valve body and the center body at a location within the center body and rearward of the seal member.

2. A brake booster according to claim 1 in which a space between the center body and the front diaphragm defines a passage for communicating between the variable pressure chambers.

3. A brake booster according to claim 2 in which a space defined between the inner surface of the center body and the outer surface of the front diaphragm provides a passage for communicating between the both variable pressure chambers, further including a projection on the outer surface of the front diaphragm.

4. A brake booster according to claim 3 in which the projection comprises a number of small projections on the outer surface of the front diaphragm.

5. A brake booster according to claim 3 in which the projection comprises an axially extending rib on the outer surface of the front diaphragm.

6. A brake booster according to claim 2 in which a space defined between the front end face of the center body located nearer the front diaphragm and the front diaphragm provides a passage for communicating between the both variable pressure chambers, and at least one of the front end face of the center body and a portion of the front diaphragm which is located opposite to the front end face is formed with an unevenness.

7. A brake booster according to claim 6 in which the front end face of the center body is formed with a slit.

8. A brake booster of tandem type including a valve body internally housing a valve mechanism which controls communication between pressure chambers defined within a shell and between a pressure chamber and the atmosphere and also formed with a passage providing communication between the pressure chambers, and a center body having a passage formed therein which is connected to the passage in the valve body and coupled to the valve body;

characterized in that the valve body includes an outer circumferential portion and the center body is disposed on said outer circumferential portion to provide oppositely disposed valve body and center body portions configured to form therebetween an annular groove and a continuing radial groove which is communicated with the annular groove, said annular groove and said radial groove communicating said passages to one another.

9. A brake booster according to claim 8 in which the center body is formed with said annular groove and said radial groove.

10. A brake booster of tandem type including a valve body internally housing a valve mechanism which controls communication between pressure chambers defined within a shell and between a pressure chamber and the atmosphere and also formed with a passage providing communication between the pressure chambers, and a center body having a passage formed therein which is connected to the passage in the valve body and coupled to the valve body;

characterized in that the valve body and center body include respective oppositely disposed portions, the valve body portion including a radial groove and the center body portion including an annular groove communicating with said radial groove, said radial groove and said annular groove communicating said passages to one another.

* * * * *